United States Patent [19]
Kitten

[11] Patent Number: 5,481,964
[45] Date of Patent: Jan. 9, 1996

[54] BARBECUE PIT STRUCTURE AND METHOD

[76] Inventor: Jerry Kitten, Rte. 2, Box 6, Slaton, Tex. 79364-9501

[21] Appl. No.: 319,878

[22] Filed: Dec. 12, 1994

[51] Int. Cl.⁶ ............................. A47J 37/04; A23B 4/04
[52] U.S. Cl. ................ 99/339; 99/352; 99/399; 99/450; 99/482; 126/25 R; 126/79
[58] Field of Search ..................... 99/339, 450, 482, 99/480, 352, 391, 392, 393, 399; 126/25 R, 79, 21 A

[56] References Cited

U.S. PATENT DOCUMENTS

| | | | |
|---|---|---|---|
| 3,477,360 | 11/1969 | Raney | 99/339 |
| 4,469,020 | 9/1984 | Hamilton et al. | 99/482 |
| 4,664,026 | 5/1987 | Milloy | 99/352 |
| 4,700,618 | 10/1987 | Cox, Jr. | 99/339 |
| 4,757,756 | 7/1988 | Van Marr | 99/482 |
| 4,840,118 | 6/1989 | Rinehart | 99/450 |

Primary Examiner—David Scherbel
Assistant Examiner—Reginald L. Alexander
Attorney, Agent, or Firm—Wendell Coffee

[57] ABSTRACT

A barbecue pit has a oven and a firebox mounted upon a frame which includes a reach pole, wheels, and a trailer hitch. The heat and smoke from the firebox enters into the bottom of the back of the oven. A baffle regulates the flow of heat into the oven and prevents flames from entering the oven. A chimney has its intake located at the bottom of the front of the oven and extends to sufficient height to prevent smoke from getting in the eyes of attendants. Access to the oven is by a rack opening. A rack rolls in and out of the oven on rollers and has a series of doors which close the rack opening of the oven when the doors are aligned therewith. The rack opening and intermediate doors, the oven is rarely opened so that smoke and heat escapes therefrom.

12 Claims, 2 Drawing Sheets

BARBECUE PIT STRUCTURE AND METHOD

BACKGROUND OF THE INVENTION (1) Field of the Invention

This invention relates to barbecuing food with heat and smoke. Cooks have ordinary skill in this art.

(2) Description of the Related Art

The barbecuing process usually involves cooking food in an open pit, in a pit with a removable cover, or in a closed pit or oven that has a means of access. These methods produce vast amounts of heat and smoke at eye level.

When an oven is opened, heat flows out of the oven and is displaced by cold air. This causes uneven heat distribution in the oven. Barbecue pits which are equipped with chimneys or flues usually have the entrance into the flues located at the top of the oven. The lighter warmed air is vented, leaving behind the heavier cooler air.

The inefficiency caused by heat venting is wasteful and environmentally detrimental. The enormous amount of smoke released is detrimental because of contact with eyes, skin, and clothing of the cook.

RANEY, U.S. Pat. No. 3,477,360, discloses a cooking apparatus illustrating many of these faults. For example, his chimney or flue (85) terminates at only slightly above eye level, and therefore, the smoke escapes in an undesirable position. When the door (7) is opened, cold air rushes in and smoke rushes out. MILLOY, U.S. Pat. No. 4,664,026, is another example of an oven type barbecue pit having a large door and a low flue. MILLOY does show a closure to close the heat vent when the door is open, thereby preventing heat loss at that time.

SUMMARY OF THE INVENTION

PROGRESSIVE CONTRIBUTION TO THE ART

I have invented a solution to, the problem of energy loss during barbecue cooking by forming an oven that is accessed by a food tray, instead of by opening an orifice. Door plates connected to the food tray limit the amount of heat and smoke loss by closing the oven opening when the tray is either partially extracted, fully extracted, or totally inserted. The lack of oxygen entering the oven will not extinguish the fire because the fire is located in a firebox connected to the oven.

Smoke is exhausted by a flue with an elevated discharge. This isolates the smoke from the eyes, skin, and clothing of the cook.

By eliminating the need for opening the oven, heat and smoke are trapped inside the oven, and cooler, outside ambient air is prevented from entering the oven. By controlling the erratic mixtures of hot and cold air, the temperature inside the oven can be stabilized, and the food can cook at an even rate. Stabilizing the temperature inside of the oven also allows the food to cook uniformly.

OBJECTS OF THIS INVENTION

An object of this invention is to barbecue food.

Another object is to control the amount of heat loss.

Yet another object is to control the amount of smoke discharged at eye level.

Further objects are to achieve the above with devices that are sturdy, compact, durable, lightweight, simple, safe, efficient, versatile, ecologically compatible, energy conserving, and reliable; yet are inexpensive and easy to manufacture, use, and maintain.

Other objects are to achieve the above with a method that is rapid, versatile, ecologically compatible, energy conserving, efficient, and inexpensive; and does not require highly skilled people to use and maintain.

The specific nature of the invention, as well as other objects, uses, and advantages thereof, will clearly appear from the following description and from the accompanying drawings, the different views of which are not necessarily scale drawings.

Figure 1:
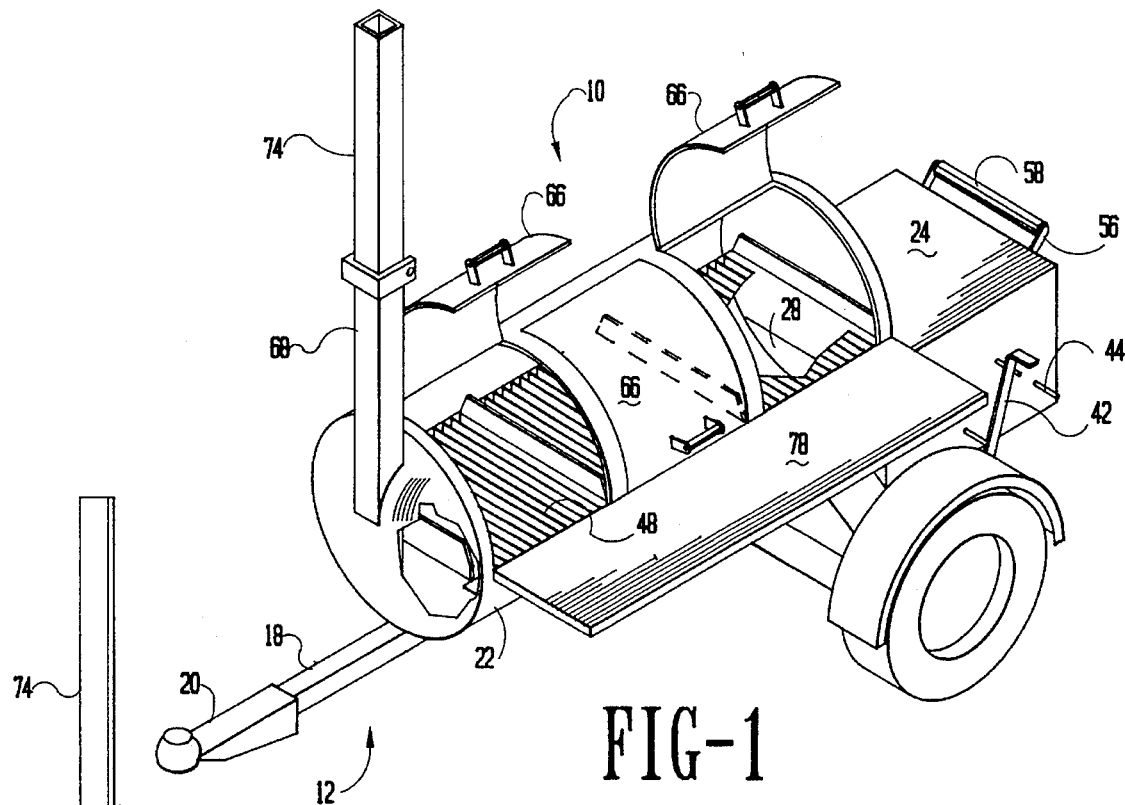
FIG. 1 is a perspective view of a barbecue pit according to this invention with the doors open showing access to the inside of the oven and with parts of the oven broken away to show internal construction.

As an aid to correlating the terms of the claims to the exemplary drawing(s), the following catalog of elements and steps is provided:

10. barbecue pit
12. trailer
14. wheels
16. frame
18. reach pole
20. trailer hitch
22. oven
24. firebox
26. walls
28. fire opening
30. grate
32. air inlet
34. slide
36. bottom of firebox
38. plate or baffle
40. hinge
42. lever
44. peg
46. oven support
48. rack
50. rack opening
52. door plate one
54. handle
56. frame support
58. rollers
60. support runners
62. intermediate door plates or door plates two
64. door plate three
66. oven doors
68. flue or chimney
70. flue bottom 72. oven bottom
74. flue extension
76. top of the oven
78. serving board

DESCRIPTION OF THE PREFERRED EMBODIMENT

Figure 2:
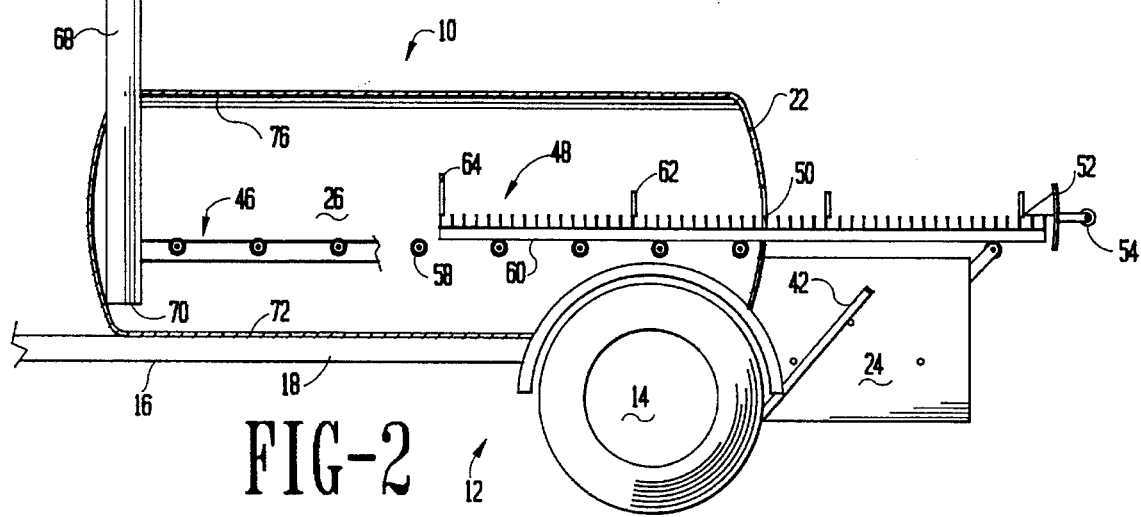
FIG. 2 is a longitudinal sectional view of the oven with the tray shown partially extended, and the firebox in elevation.
Figure 5:
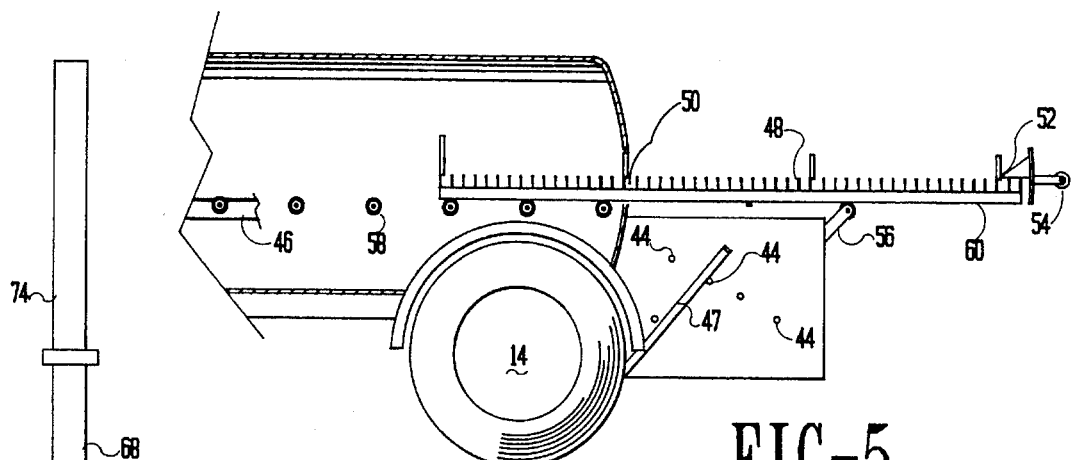
FIG. 5 is a longitudinal sectional partial view of the oven and elevation of the firebox showing the oven's opening closed by one of the intermediate door plates.

Referring to the drawings, in particular FIGS. 1 and 2, there may be seen a representation of the invention. Specifically, barbeque pit 10 is mounted on trailer 12 for mobility. The trailer will have wheels 14 attached to frame 16. The frame will include reach pole 18 with trailer hitch 20 at the forward end of the trailer.

Oven 22 is mounted upon the frame 16. The oven is generally cylindrical. The axis of the cylinder is parallel to the reach pole 18.

The forward portion of the pit will be that portion which is toward the trailer hitch 20 and the rear portion will be in the opposite direction. At the rear of the oven 22, firebox 24 is attached to the frame 16. The oven will have walls 26.

Figure 3:
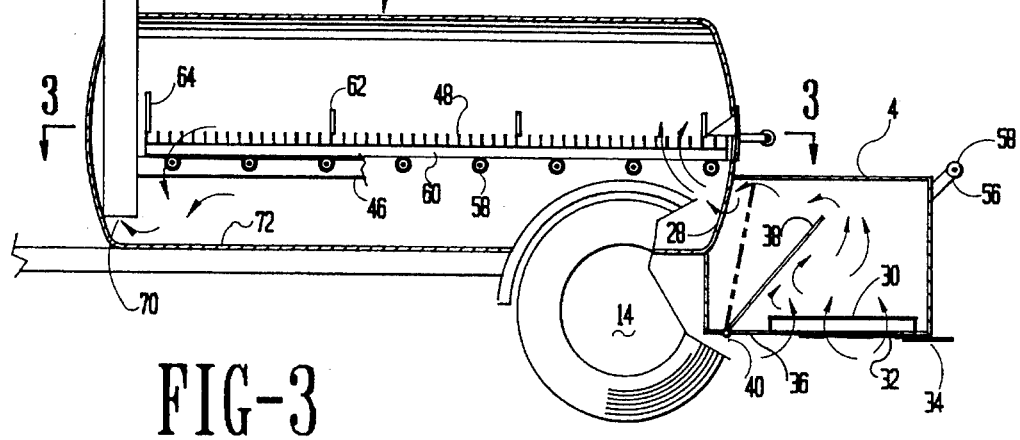
FIG. 3 is a longitudinal sectional view of the oven and firebox showing the tray in the closed position, and showing the operation of the fire baffle in the firebox.
Figure 4:
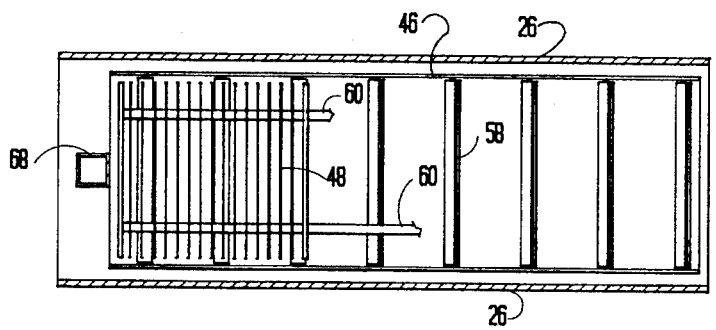
FIG. 4 is a top plan view taken substantially on Line 4—4 of FIG. 3 showing the layout of the tray and supports with a portion of the tray broken away.

FIG. 3 shows that the firebox 24 communicates with the oven 22 by fire opening 28. The firebox will include a door (not shown) at the rear of the firebox for adding fuel to the firebox. The fuel for the firebox is placed upon grate 30 at bottom 36 of the firebox. Adjustable air inlet 32 is in the bottom of the firebox. The adjuster for the air inlet is slide 34 which is mounted below the openings at the bottom 36 of the firebox.

Though the fuel to be used would normally be wood or charcoal, any of several fuels could be used. With little or no modification, a burner can be inserted in the firebox 24 which would be fueled by liquified petroleum gas, such as butane.

Fire baffle in the form of plate 38, is pivoted by hinge 40 to the bottom 36 of the firebox 24 at the forward end of the firebox. The position of the baffle or plate 38 is controlled by lever 42, which connects to the baffle 38 and extends outside of the firebox and is placed over a selected peg of the series of pegs 44. If the baffle is closed, there will be a restricted amount of heat and smoke flowing from the firebox into the oven 22. If the baffle is open, all available heat and smoke from the firebox will flow into the oven.

The baffle can be adjusted to prevent any flames of the burning fuel on the grate 30 from entering the oven 22. Flames entering the oven from the firebox 24 are undesirable because the flames cause intense heat and burning at the rear of the oven. Such a condition would not result in uniform cooking of the food in the oven.

Support 46 is attached within the oven 22. Rack 48 is supported by the support 46. The rack 48 is mounted for axial movement to the forward or to the rearward of the oven. Rack opening 50 is made in the oven rear. The rack opening is above the top of the firebox 24 and in line with the rack so that the rack may be longitudinally moved upon support 46. In the fully closed position, door plate 52 will close the opening. The door plate 52 is securely attached to the rack. Handle 54 is securely attached to the door plate 52.

Frame support 56 is attached to the rear of the firebox 24. The frame support is at the same level as the oven support 46 within the oven 22. Therefore, when the rack 48 is extended from the oven, the rack would be supported by the exterior frame support as well as by the oven support 46.

Although, the supports 46 and 56 could be of any particular sliding design, it is preferable that they include rollers 58 which are journalled selectively to the supports 46 and 56. The rack 48 will have support runners 60 at the bottom of the rack, which will run upon the rollers 58.

Intermediate door plates 62 are attached to the rack 48 between door plate one 52 and door plate three 64. Intermediate door plates are also described as door plates two.

The door plate three 64 closes the rack opening 50 when the rack 48 is fully extended. Also, door plate three prevents the accidental removal of the rack from the oven 22. Likewise, door plate one 52 stops the rack when the rack is fully inserted within the oven.

The rack 48 may be partially withdrawn to any point where a door plate two 62 is at the rack opening 50. Thus, when the rack is partially withdrawn, the oven 22 is still closed. This not only preserves the uniform heat within the oven, but also prevents the escape of smoke which is irritating to the attendants.

Three doors 66 are hinged to the walls 26 over corresponding openings in the upper wall of the oven 22. In a conventional oven, doors similar to these are used to place or remove food from the rack for cooking. For better heat control, these doors would be securely fastened (or locked) in the closed position to preserve heat within the oven. The doors are provided for the installation, cleaning, and maintenance of the oven support 46.

Flue (or chimney) 68 is connected to the oven 22 at the forward end of the oven. The bottom 70 of the flue extends to near bottom 72 of the oven. Although the flue might not have its opening 70 at the bottom 72 of the oven, it will be closer to the bottom than it is to top 76 of the oven.

Hot gases and smoke from the firebox 24 will enter the oven 22 through the fire opening 28 and rise toward the top of the oven, as represented by the arrows in FIG. 3. The smoke and gases at or near the forward end of the oven move downward because they would be cooler and because the flue 68 would draw the gases through the flue. Therefore, there will be a full movement of gases through the oven, and the oven will have a substantially even temperature throughout the oven.

The height of the flue 68 will be limited because the barbecue pit 10 is made for travel upon public roads, and a tall flue would be inconvenient. Also, the barbecue pit 10 might be stored in garages or other buildings, and therefore, the height would be limited to the opening of the garage. Therefore, extension 74 is provided to be attached to the flue. With the particular construction of the flue extending towards the bottom 72 of the oven, additional extension for the flue is needed to cause the gases to draw well through the flue. In addition, it is desirable that the gases escaping from the top of the flue to be well above the normal location of the attendants of the barbecue pit to prevent smoke from getting in their eyes.

The embodiment shown described above is only exemplary. I do not claim to have invented all of parts, elements or steps described. Various modifications could be made in the construction, material arrangement, and operations and still be within the scope of my invention.

Those with ordinary skill in the art will understand that there are often many additional features optionally placed upon barbecue pits. For example, serving boards 78 may be attached along one side of the oven 22. Not shown, but readily available for attachment, are holders for barbecue sauce or condiments of different types. Also, supports can be placed adjacent to the flue 68 or extending back from the flue over the oven for different implements or decorative flags or pennants. Sunshades or rain protectors can be attached to these supports as desired.

The restrictive description and drawing of the specific example above, does not point out what an infringement of this patent would be, but are to enable one skilled in the art to make and use the invention. The limits of the invention and bounds of patent protection are measured by and defined in the following claims.

I claim as my invention:

1. A Bar-B-Que pit having:
   a) a firebox,
   b) an oven having
   c) walls
   d) means for transferring the smoke and heat from the firebox to the oven;
   wherein the improved pit comprises:
   e) an oven support on the inside of the oven,
   f) an opening in one of the walls of the oven,
   g) a rack resting upon the support in the oven, and
   h) a door plate on the rack for closing said opening in the wall of the oven,
   i) said oven support being rollers so that the rack rolls on the rollers.

2. The invention as defined in claim 1 further comprising:
   j) said firebox and said oven mounted on a frame, which is a portion of,
   k) a trailer which includes wheels and a trailer hitch.

3. The invention as defined in claim 1 further comprising:
   j) an adjustable fire baffle between the firebox and the oven.

4. The invention as defined in claim 1 further comprising:
   j) the oven has a top and bottom,
   k) an upright flue extending far inside the oven from near the bottom and through the top.

5. A Bar-B-Que pit having:
   a) a firebox,
   b) an oven having
   c) walls
   d) means for transferring the smoke and heat from the firebox to the oven;
   wherein the improved pit comprises:
   e) an oven support on the inside of the oven,
   f) an opening in one of the walls of the oven,
   g) a rack resting upon the support in the oven, and
   h) a door plate on the rack for closing said opening in the wall of the oven,
   i) at least three door plates upon the rack identified as plate one, plate two and plate three,
   j) the plate one attached so that the plate one closes the opening when the rack is fully inserted within the oven,
   k) the plate two attached so that the plate two closes the opening when the rack is partially inserted within the oven, and
   l) the plate three which closes the opening when the rack is fully extended from the oven.

6. The invention as defined in claim 5 further comprising:
   m) said firebox and said oven mounted on a frame, which is a portion of,
   n) a trailer which includes wheels and a trailer hitch.

7. The invention as defined in claim 5 further comprising:
   m) an adjustable fire baffle between the firebox and the oven.

8. The invention as defined in claim 5 further comprising:
   m) an upright flue extending far inside the oven from near the bottom and through the top.

9. A Bar-B-Que pit having:
   a) a firebox,
   b) an oven having
   c) walls
   d) means for transferring the smoke and heat from the firebox to the oven;
   wherein the improved pit comprises:
   e) an oven support on the inside of the oven,
   f) an opening in one of the walls of the oven,
   g) a rack resting upon the support in the oven, and
   h) a door plate on the rack for closing said opening in the wall of the oven,
   i) adjustable fire baffle between said firebox and said oven.
   j) said baffle pivoted to the bottom of the firebox and
   k) a lever outside the firebox connected to said baffle.

10. The invention as defined in claim 9 further comprising:
    l) said firebox and said oven mounted on a frame, which is a portion of,
    m) a trailer which includes wheels and a trailer hitch.

11. The invention as defined in claim 9 further comprising:
    l) the plate one attached so that the plate one closes the opening when the rack is fully inserted within the oven,
    m) the plate two attached so that the plate two closes the opening when the rack is partially inserted within the oven, and
    n) the plate three which closes the opening when the rack is fully extended from the oven.

12. The invention as defined in claim 9 further comprising:
    l) the oven has a top and bottom,
    m) an upright flue extending far inside the oven from near the bottom and through the top.

* * * * *